(12) United States Patent
Hiyama et al.

(10) Patent No.: US 7,401,839 B2
(45) Date of Patent: Jul. 22, 2008

(54) RETRACTABLE ROOF AND VEHICLE THEREWITH

(75) Inventors: Shigeki Hiyama, Hiroshima (JP); Kozo Odoi, Hiroshima (JP); Tomoaki Matsunobu, Hiroshima (JP)

(73) Assignees: Webasto AG, Stockdorf (DE); Mazda Motor Corporation, Hiroshima (JP)

( * ) Notice: Subject to any disclaimer, the term of this patent is extended or adjusted under 35 U.S.C. 154(b) by 0 days.

(21) Appl. No.: 11/724,206

(22) Filed: Mar. 15, 2007

(65) Prior Publication Data

US 2007/0228767 A1 Oct. 4, 2007

(30) Foreign Application Priority Data

Mar. 28, 2006 (JP) ............... 2006-088556

(51) Int. Cl.
*B60J 7/08* (2006.01)
(52) U.S. Cl. .................................... 296/108
(58) Field of Classification Search ............. 296/108, 296/107.01, 121, 107.16, 107.17, 107.19, 296/107.2
See application file for complete search history.

(56) References Cited

U.S. PATENT DOCUMENTS

| 4,529,243 A * | 7/1985 | Kaltz et al. ............. 296/121 |
|---|---|---|
| 4,895,409 A * | 1/1990 | Konishi et al. ........... 296/107.2 |
| 6,135,535 A * | 10/2000 | Tarahomi .................... 296/102 |
| 6,857,684 B2 * | 2/2005 | Worley .................. 296/100.06 |
| 7,140,666 B2 * | 11/2006 | Wulf et al. ................... 296/124 |
| 2004/0032145 A1 * | 2/2004 | Worley ........................ 296/108 |
| 2007/0228767 A1 * | 10/2007 | Hiyama et al. .............. 296/108 |

FOREIGN PATENT DOCUMENTS

| JP | 61-249817 | 11/1986 |
|---|---|---|
| JP | 63-090432 | 4/1988 |
| JP | 4-4167 | 1/1992 |
| JP | 5-10245 | 2/1993 |
| JP | 2002-264658 | 9/2002 |

* cited by examiner

*Primary Examiner*—H Gutman
(74) *Attorney, Agent, or Firm*—Studebaker & Brackett PC; Donald R. Studebaker

(57) ABSTRACT

A retractable roof includes a front roof panel, a back roof panel formed by joining outer and inner panel layers to each other, a lower link pivotally connected to a vehicle body member, an upper link pivotally connected to the front roof panel, and an intermediate link rigidly connected to each of the lower link and the upper link. The intermediate link is placed in between the outer and inner panel layers of the back roof panel.

6 Claims, 9 Drawing Sheets

RETRACTABLE ROOF AND VEHICLE THEREWITH

CROSS-REFERENCE TO RELATED APPLICATION

This application claims priority under 35 USC 119 to Japanese Patent Application No. 2006-88556 filed on Mar. 28, 2006, the entire contents of which are incorporated herein by reference.

BACKGROUND OF THE INVENTION (a) Field of the Invention

This invention relates to retractable roofs and vehicles therewith.

(b) Description of the Related Art

For example, Published Japanese Patent Application No. 2002-264658 discloses a retractable roof for a vehicle changeable between an in-use position to cover the passenger compartment and a retracted position in which the roof is stowed in a storage room of the vehicle to leave the passenger compartment open.

The retractable roof disclosed in the above published patent application includes a front roof panel, a back roof panel and a pair of quadric chains disposed on either side of the width of the passenger compartment. Each quadric chain includes a pair of opposite first and second link members that are both pivotally connected to the front roof panel and a vehicle body member to link the vehicle body member with the front roof panel. The back roof panel is fixed to one of the pair of opposite link members.

The above linkage configuration enables the retractable roof to change between an in-use position to cover the passenger compartment from above with the front roof panel and cover it from the rear with the back roof panel and a retracted position in which the front and back roof panels are stowed in vertically overlying relation in the storage room.

However, when the retractable roof disclosed above is in its in-use position, the pair of opposite first and second link members of each quadric chain protrude into the passenger compartment. This invites a problem of disfiguring the passenger compartment.

To eliminate the above problem, it can be considered to hide the pair of opposite link members as with a trim piece. In this case, however, the trim piece is placed more inward than another link member disposed inside the roof panel, which invites another problem that the passenger compartment space is narrowed.

SUMMARY OF THE INVENTION

The present invention has been made in view of the foregoing and, therefore, its object is to provide a retractable roof and a vehicle therewith that improve the appearance of the passenger compartment and concurrently widen the space thereof to improve the comfortableness therein.

More specifically, in one aspect of the present invention, a retractable roof includes a roofing member for covering a passenger compartment of a vehicle and a linkage mechanism for changing the roofing member between an in-use position to cover the passenger compartment and a retracted position in which the roofing member is stowed in a storage room formed rearward of the passenger compartment to leave the passenger compartment open.

The roofing member includes a front roof panel for covering the passenger compartment from above and a back roof panel, disposed on the rear side of the front roof panel, for covering the passenger compartment from the rear. The back roof panel is formed by joining an outer panel layer and an inner panel layer to each other.

The linkage mechanism includes a segmental link segmented into a lower link pivotally connected to a vehicle body member, an upper link pivotally connected to the front roof panel, and an intermediate link disposed between and rigidly connected to the lower link and the upper link. The intermediate link is placed in between the outer and inner panel layers of the back roof panel.

In the above configuration, out of the segmental link segmented into the upper, lower and intermediate links, the intermediate link is placed in between the outer and inner panel layers of the back roof panel. Therefore, the intermediate link is hidden behind the inner panel layer as viewed from the interior of the passenger compartment. Thus, the intermediate link is not exposed to the passenger compartment, which improves the appearance of the passenger compartment. Furthermore, if the inner panel layer of the back roof panel forms a corresponding part of the wall surface of the passenger compartment, this eliminates the need to provide any special cover for covering the intermediate link, such as a trim piece. Therefore, the passenger compartment space can be accordingly widened, thereby enhancing the comfortableness in the passenger compartment.

The intermediate link may be a reinforcement for the back roof panel.

Since in this case the intermediate link serves also as a reinforcement for the back roof panel, the retractable roof can be reduced in the number of parts and can be saved in weight. The weight saving of the retractable roof is advantageous in stabilizing the position change operation of the roofing member and improving the durability of the linkage mechanism.

In addition, since in this case the outer panel layer, the inner panel layer and the intermediate link (reinforcement) contribute to the rigidity of the segmental link, this is advantageous in ensuring the rigidity of the segmental link.

The back roof panel may be made of resin and the intermediate link may be made of metal.

Thus, the retractable roof can be saved in weight while keeping a required rigidity.

The linkage mechanism may comprise a quadric chain formed by a pair of opposite links being both pivotally connected to the front roof panel and the vehicle body member and the segmental link may function as one of the pair of opposite links forming part of the quadric chain.

A common quadric chain for connecting a front roof panel and a vehicle body member to each other is configured so that a pair of opposite link members are arranged alongside each other in the vehicle front-to-rear direction on the inside of the roof. In contrast, in the above inventive configuration, the segmental link placed in the back roof panel functions as one of the pair of opposite links forming part of the quadric chain. Thus, the back roof panel itself functions as a link, which is equivalent to that one of the pair of opposite links is eliminated.

Therefore, one link member is eliminated which is disposed on the inside of the roof and which protrudes into the passenger compartment when the roof is in its in-use position. The passenger compartment space can be accordingly widened in a vertical direction.

Furthermore, in the common quadric chain including a pair of opposite link members, the pair of opposite link members must be offset from each other in the vehicle widthwise direction because they pass by each other during position change of the roof. Since in the above inventive configuration the segmental link is placed in the back roof panel, this avoids that the pair of opposite links are offset from each other on the inside of the roof, which accordingly widens the passenger compartment space in the vehicle widthwise direction.

Since in the above inventive configuration the passenger compartment space can be widened in the vehicle vertical and widthwise directions as described above, this improves the comfortableness in the passenger compartment.

The back roof panel may be divided into a back window and a middle roof panel disposed between the back window and the front roof panel, and the other of the pair of opposite links forming part of the quadric chain may comprise: a window link lever pivotally connected to the back window and the vehicle body member; a pair of link levers both pivotally connected to the back window and the middle roof panel to provide another quadric chain; and a control link pivotally connected to any one of the back window and the link levers and pivotally connected to the front roof panel.

Thus, the said other link is composed of a plurality of relatively short links connected to each other. Therefore, there is no need for a single long link member for connecting the front roof panel and the vehicle body member to each other. This further reduces the protrusion of the link into the passenger compartment. A long link member will be a relatively heavy member in order to ensure its rigidity. Since in the above inventive configuration such a long link member is no longer needed, the retractable roof can be saved in weight.

In the retractable roof, synchronization is required between the position change operation of the roofing member and the relative movement of the back window to the middle roof panel. In the above inventive configuration, the synchronization is realized by pivotally connecting the control link to any one of the back window and the link levers. In other words, the control link contributes to both the position change operation of the roof member and the relative movement of the back window to the middle roof panel. Therefore, there is no need for an additional link member solely for synchronizing the above position change operation with the above relative movement.

In a vehicle with the above inventive retractable roof, the middle part of the segmental link is placed in the back roof panel as described above. Therefore, the passenger compartment space can be widened to improve the comfortableness in the passenger compartment while the appearance of the passenger compartment can be improved.

DETAILED DESCRIPTION OF THE INVENTION

An embodiment of the present invention will be described in detail below with reference to the drawings. The following description of the preferred embodiment is merely illustrative in nature and is not intended to limit the scope, applications and use of the invention.

Figure 1:
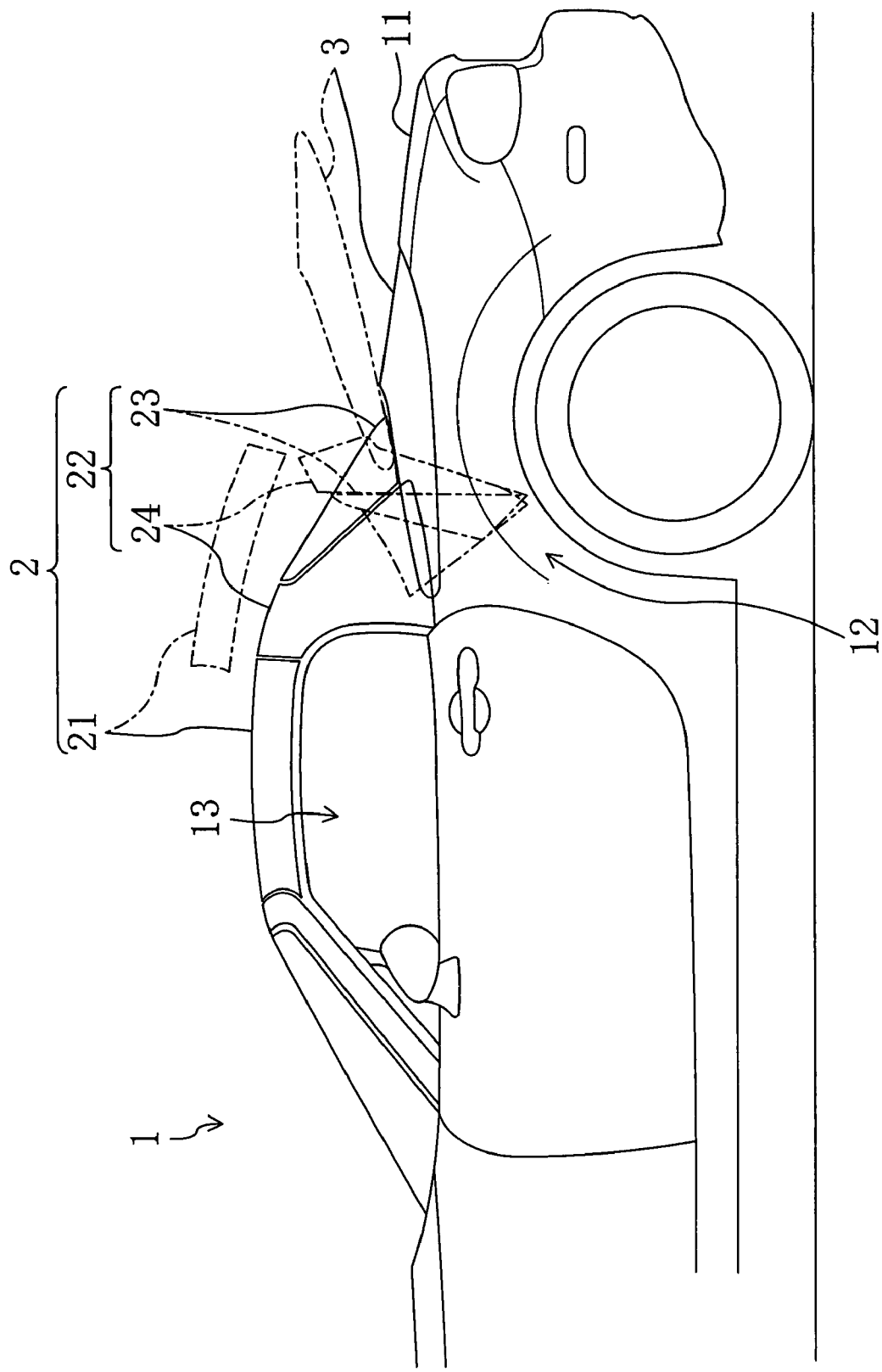
FIG. 1 is a side view of a vehicle in which a retractable roof is in an in-use position.
Figure 2:
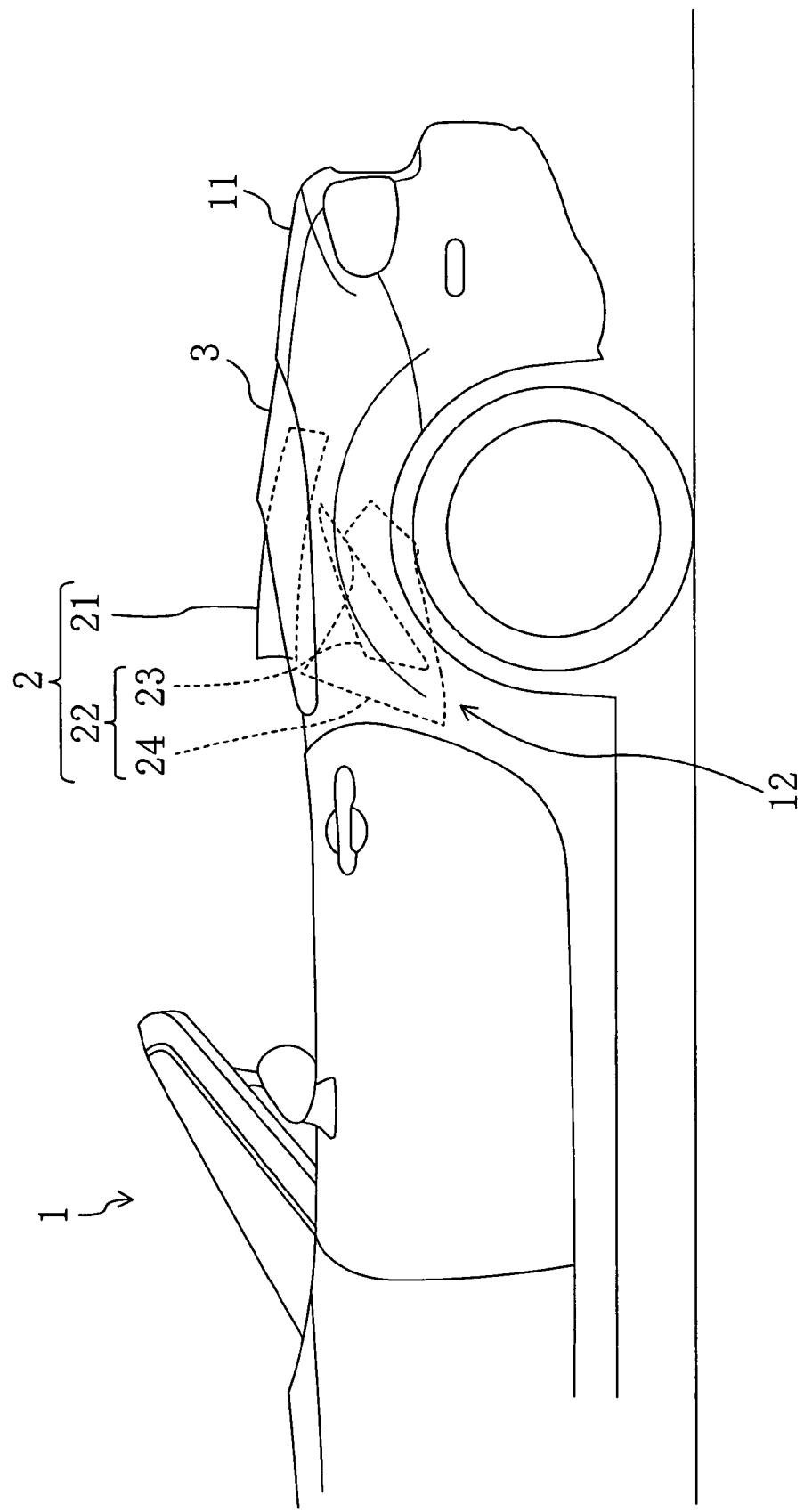
FIG. 2 is a side view of the vehicle in which the retractable roof is in a retracted position.

FIGS. 1 and 2 are schematic side views showing a vehicle 1 on which a retractable roof according to the present invention is mounted. The retractable roof 2 includes a front roof panel 21 for covering a passenger compartment 13 from above and a back roof panel 22, disposed on the rear side of the front roof panel 21, for covering the passenger compartment 13 from the rear. The back roof panel 22 includes a back window 23 made of transparent material and a middle roof panel 24 disposed between the front roof panel 21 and the back window 23 and constituting a pillar (a post) for the vehicle 1.

Each of the front and middle roof panels 21 and 24 is formed by joining an outer panel layer 25 forming the outer surface of the roof to an inner panel layer 26 located on the vehicle interior side of the outer panel layer 25. A plate reinforcement (intermediate link) 27 is appropriately placed in between the outer and inner panel layers 25 and 26 (see FIG. 6). The outer and inner panel layers 25 and 26 are made of, for example, resin, while the reinforcement 27 is made of metal. Thus, the retractable roof 2 can be saved in weight.

The vehicle 1 has a trunk room (a boot) formed in the rear and the opening of the trunk room is closed by an openable trunk lid 11. Between the passenger compartment 13 and the trunk room, a storage room 12 for stowing the retractable roof 2 is formed open upward.

A deck lid 3 is disposed at the upper end opening of the storage room 12. While the retractable roof 2 covers the passenger compartment 13 (i.e., when it is in an in-use position as described later), the deck lid 3 is positioned between the rear edge of the roof 2 and the opening edge of the storage room 12. Thus, the deck lid 3 closes part of the upper end opening of the storage room 12.

The retractable roof 2 is changeable in position, by a linkage mechanism not given in FIGS. 1 and 2, between an in-use position to cover the passenger compartment 13 (see FIG. 1) and a retracted position in which it is stowed in the storage room 12 to leave the passenger compartment 13 open (see FIG. 2). The deck lid 3 is also changeable in position, by a linkage mechanism (not shown) different from the linkage mechanism for position change of the retractable roof 2, between a home position to cover part of the upper end opening of the storage room 12 (see FIGS. 1 and 2) and a back-off position in which the deck lid 3 backs off rearward and diagonally upward from the home position to leave the upper end opening of the storage room 12 open (see the dot-dash lines of FIG. 1).

A brief description is given here of the position change operation of the retractable roof 2, i.e., the operation for changing the retractable roof 2 from its position to cover the passenger compartment 13 from its position to leave the passenger compartment 13 open, with reference to FIGS. 1 and 2. First, the deck lid 3 is moved, by the associated linkage mechanism, from its home position shown in the solid lines of FIG. 1 to its back-off position shown in the dot-dash lines of FIG. 1 to leave the upper end opening of the storage room 12 open. Concurrently or a predetermined time after, the linkage mechanism for the retractable roof 2 operates so that the middle roof panel 24 turns backward (clockwise in FIG. 1) about a fixed axis of rotation and the front roof panel 21 accordingly slides rearward and diagonally upward. The back window 23 moves downward while moving frontward relative to the middle roof panel 24 (see the dot-dash lines of FIG. 1).

When the linkage mechanism for the retractable roof 2 further operates, as shown in the solid and broken lines in FIG. 2, the front and middle roof panels 21 and 24 are stowed in vertically overlying relation in the storage room 12. At this time, the back window 23 is brought into superposed relation with the middle roof panel 24 as viewed along an axis extending in a widthwise direction of the vehicle (as viewed in the state shown in FIG. 2).

After the retractable roof 2 is stowed in the storage room 12, the linkage mechanism for the deck lid 3 operates so that the deck lid 3 moves from its back-off position to its home position to close part of the storage room 12. Thus, the passenger compartment 13 is left open.

On the other hand, in changing the retractable roof 2 from its position to leave the passenger compartment 13 open to its position to cover the passenger compartment 13, the above operation is reversed.

Figure 3:
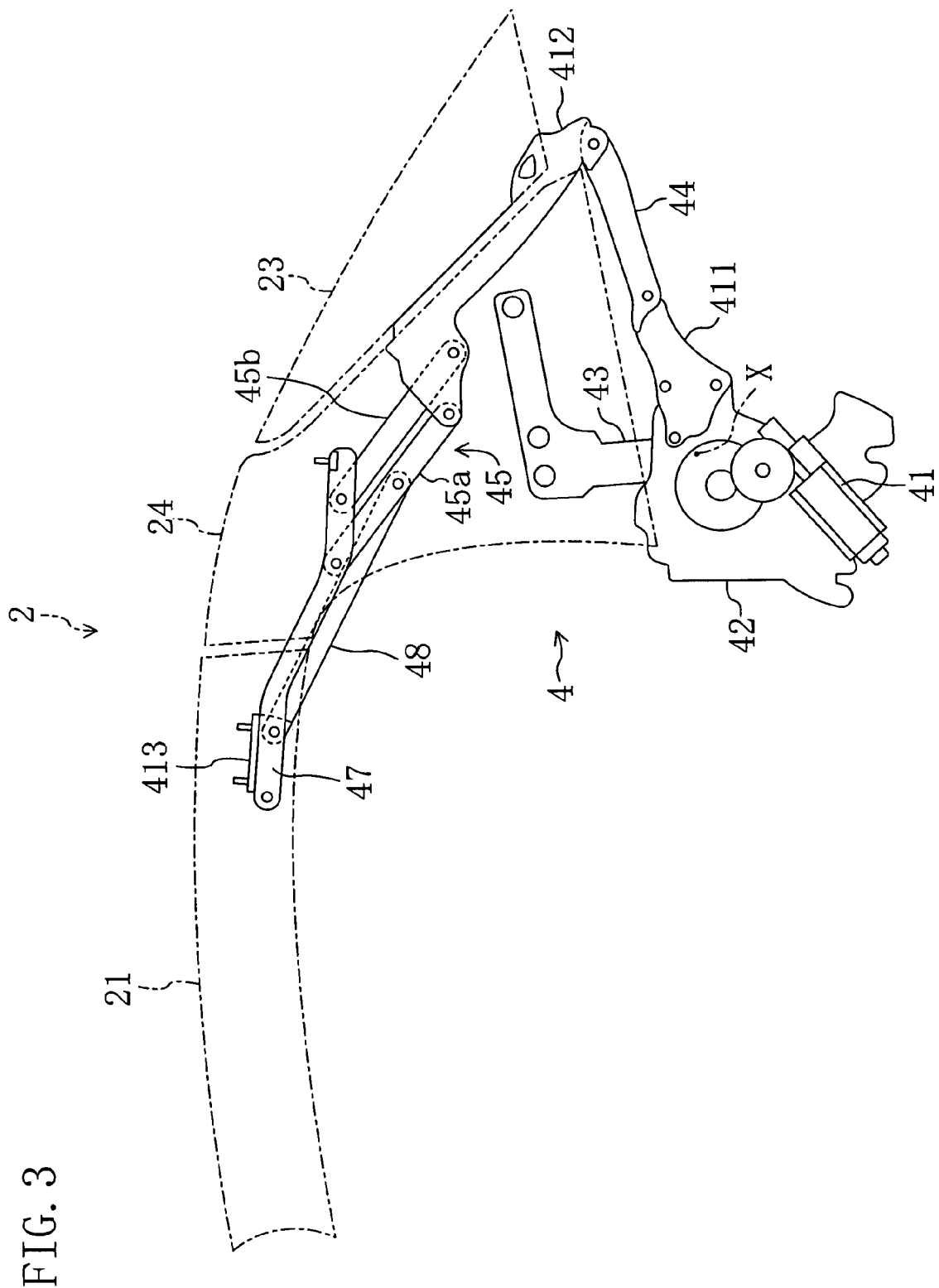
FIG. 3 is a side view showing a linkage mechanism of the retractable roof in in-use position.
Figure 4:
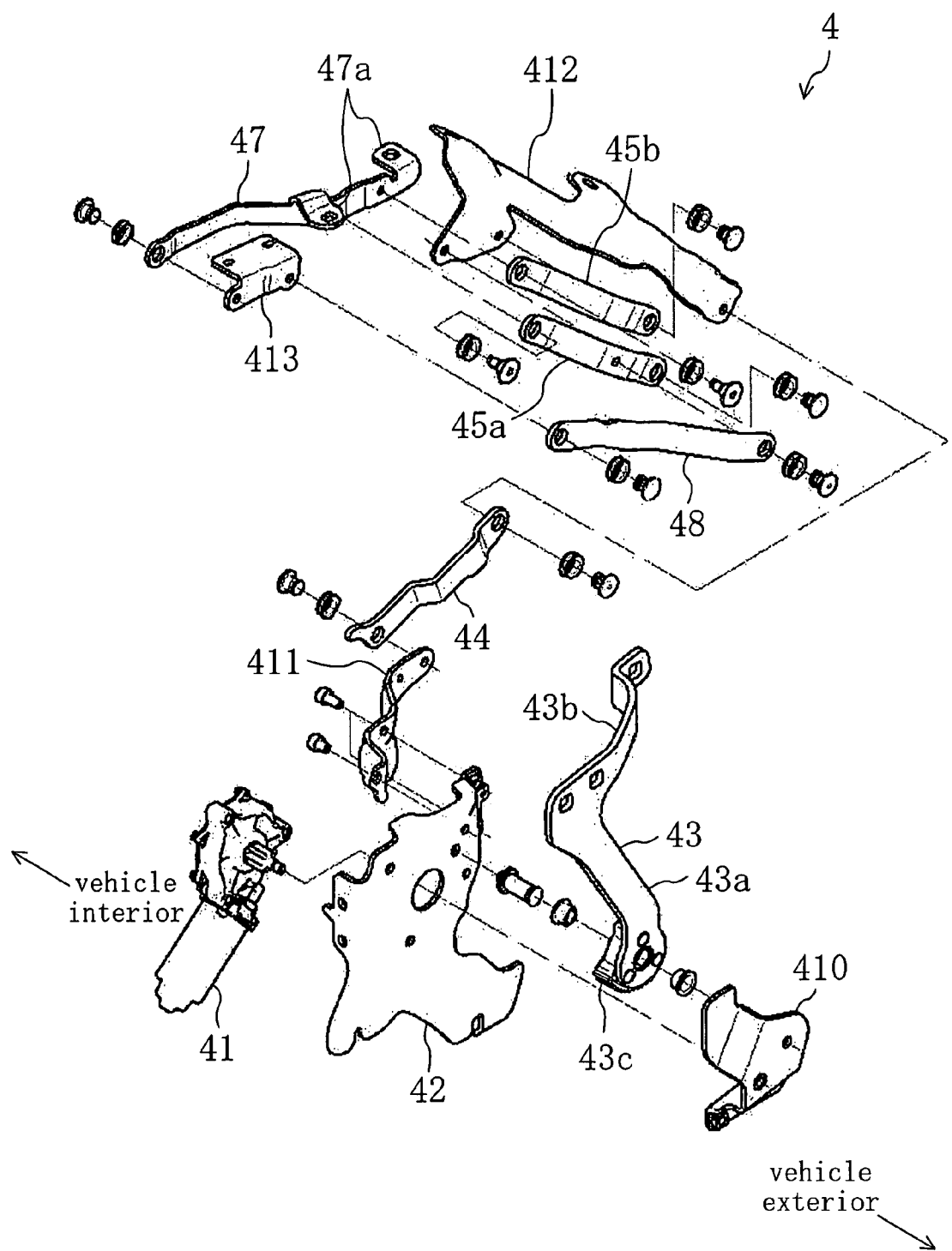
FIG. 4 is an exploded perspective view of the linkage mechanism.
Figure 5:
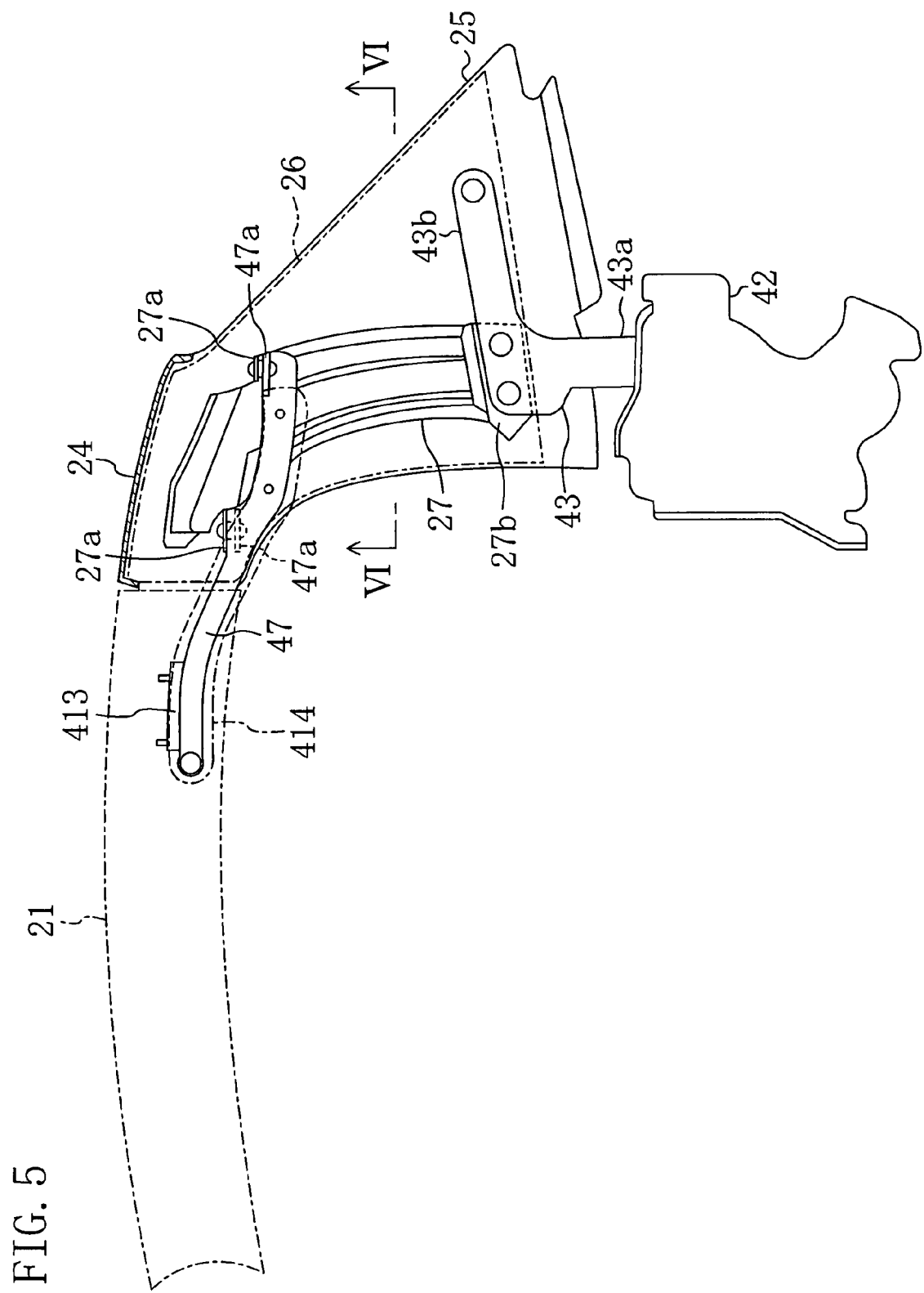
FIG. 5 is a side view showing the structure of a segmental link.

FIGS. 3 to 5 illustrate the linkage mechanism 4 for the retractable roof 2. Two linkage mechanisms 4 of this type are disposed on either side of the width of the interior space of the retractable roof 2. Note that FIGS. 3 and 5 are side views of the linkage mechanism 4 disposed on the right side of the interior space of the retractable roof 2 as viewed from the left side of the vehicle 1 and FIG. 4 is a perspective view showing the linkage mechanism 4 in disassembled form, which is to be disposed on the left side of the interior space of the retractable roof 2.

Each linkage mechanism 4 includes a quadric chain essentially formed by a pair of opposite first and second links being both pivotally connected to the front roof panel 21 and a vehicle body member.

The linkage mechanism 4 is of electric motor-driven type in this embodiment. A drive motor 41 serving as a drive source is fixed, as by bolts, to a main bracket 42 fixed to the vehicle 1. The main bracket 42 is a vehicle body member having substantially the shape of a plate and disposed in the storage room 12. Thus, the main bracket 42 is located below the middle roof panel 24 when the retractable roof 2 is in its in-use position (see FIG. 3).

A lower arm 43 is attached to the vehicle exterior side of the main bracket 42. The lower arm 43 is sandwiched between the main bracket 42 and a base plate 410 and thereby attached to them for pivotal movement relative to the main bracket 42 about a pivot axis X extending in the vehicle widthwise direction.

Figure 9:
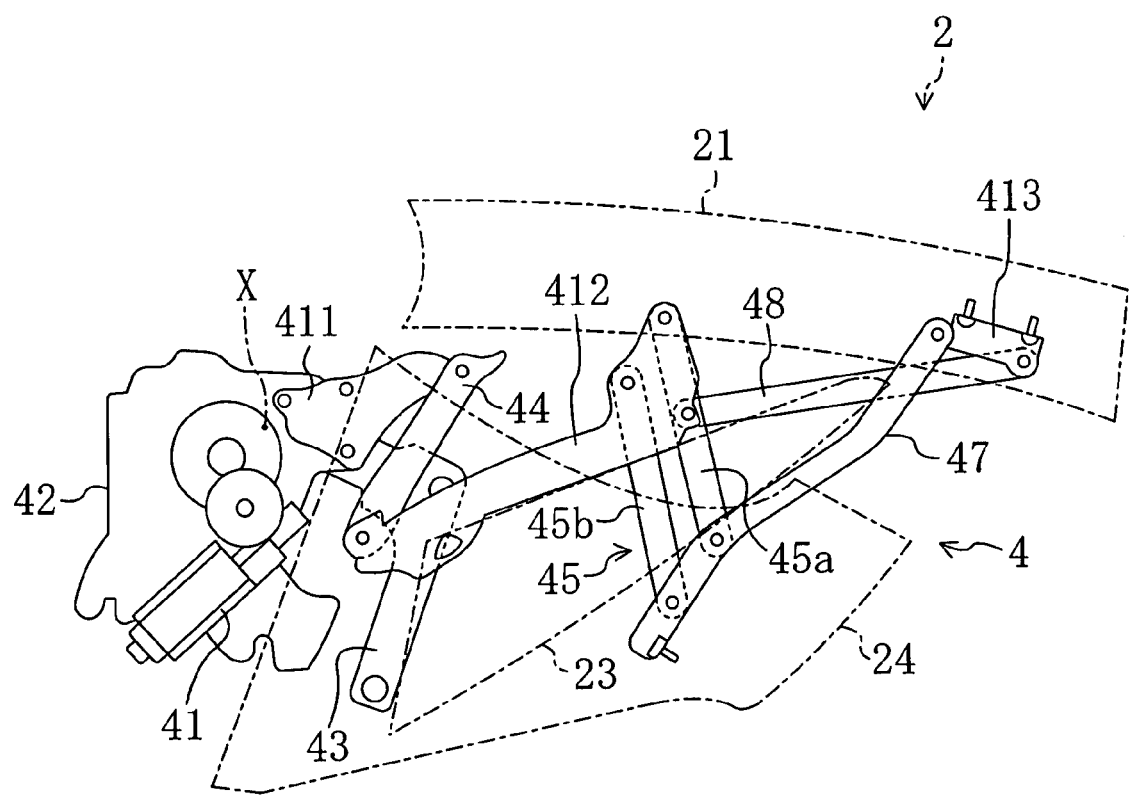
FIG. 9 is a side view showing the linkage mechanism of the retractable roof in retracted position.

The lower arm 43 includes an arm body 43a extending vertically and a fixed part 43b bent from the upper end of the arm body 43a and fixed to the middle roof panel 24 as described later. The root end of the arm body 43a has a speed reduction gear 43c fixed thereto and meshing with a drive gear mounted on the drive shaft of the drive motor 41. Thus, with the rotation of the drive motor 41, the lower arm 43 turns about the pivot axis X between a position for the arm body 43a to stand upright as shown in FIG. 3 and a position for the arm body 43a to fall down rearward as shown in FIG. 9.

The main bracket 42 is provided with a window bracket base 411 fixed thereto to extend rearward and diagonally upward from the rear end thereof in the vicinity of the upper end thereof. The window bracket base 411 is provided with a window link lever 44 pivotally connected to the rear end thereof.

The window link lever 44 has through holes formed at its front and rear ends. The window link lever 44 is mounted to the rear end of the window bracket base 411 as by a bolt journalled in a bush inserted in the through hole at the front end. Thus, the window link lever 44 is pivotally movable relative to the window bracket base 411 about an axis extending in the vehicle widthwise direction.

A pair of window brackets 412 are fixed to either end of the back window 23 in the vehicle widthwise direction. The rear end of each window link lever 44 is pivotally connected to the lower end of the associated window bracket 412. Specifically, each window link lever 44 is mounted to the lower end of the associated window bracket 412 as by a bolt journalled in a bush inserted in the through hole at the rear end. Thus, the window link lever 44 is pivotally movable relative to the window bracket 412, or in other words relative to the back window 23, about an axis extending in the vehicle widthwise direction.

The upper end of the window bracket 412 has two mounting holes formed at a specified distance apart from each other in the front-to-rear direction. First and second link levers 45a and 45b are pivotally connected to the window bracket 412 at the front and rear mounting holes, respectively.

The first and second link levers 45a and 45b are link levers having substantially the same length and are arranged alongside each other in the vehicle front-to-rear direction to have a rising gradient towards the front when the retractable roof 2 is in its in-use position. Each of the first and second link levers 45a and 45b has through holes formed at its upper and lower ends. The first and second link levers 45a and 45b are mounted to the upper end of the window bracket 412 as by associated bolts journalled in associated bushes inserted into the through holes at their lower ends. Thus, the first and second link levers 45a and 45b are pivotally movable relative to the window bracket 412 about their axes extending in the vehicle widthwise direction or, in other words, they are pivotally connected to the back window 23.

Fixed to an upper end of the middle roof panel 24 is an upper arm 47 extending frontward towards the front roof panel 21 as described later. The upper ends of the first and second link levers 45a and 45b are pivotally connected to the upper arm 47. Specifically, the first and second link levers 45a and 45b are mounted to the rear end of the upper arm 47 as by associated bolts journalled in associated bushes inserted into the through holes at their upper ends. Thus, the first and second link levers 45a and 45b are pivotally movable relative to the upper arm 47 about their axes extending in the vehicle widthwise direction. In other words, the first and second link levers 45a and 45b are pivotally connected to the middle roof panel 24.

In this manner, the first and second link levers 45a and 45b are pivotally connected to the middle roof panel 24 and the back window 23. Therefore, the first and second link levers 45a and 45b lie between the middle roof panel 24 and the back window 23 to provide a quadric chain (a secondary quadric chain 45) for restricting the relative movement between the middle roof panel 24 and the back window 23.

The front roof panel 21 has a front roof bracket 413 fixed to the vicinity of its rear end. The front end of the upper arm 47 is pivotally connected to the front roof bracket 413. Specifically, the upper arm 47 has a through hole formed at its front end and is mounted to the front roof bracket 413 as by a bolt journalled in a bush inserted in the through hole. Thus, the upper arm 47 is pivotally movable relative to the front roof bracket 413 about an axis extending in the vehicle widthwise direction. In other words, the upper arm 47 is pivotally connected to the front roof panel 21.

The front roof bracket 413 has a second through hole formed rearward of the pivotal point (the through hole) of the upper arm 47. At the second through hole, an upper end of an control link 48 is pivotally connected to the front roof bracket 413.

The control link 48 is disposed to have a rising gradient towards the front when the retractable roof 2 is in its in-use position. The control link 48 has two through holes formed at its upper and lower ends. The control link 48 is mounted to the second through hole in the front roof bracket 413 as by a bolt journalled in a bush inserted in the through hole at its upper end. Thus, the control link 48 is pivotally movable relative to the front roof panel 21 about an axis extending in the vehicle widthwise direction. In other words, the control link 48 is pivotally connected to the front roof panel 21.

The first link lever 45a has a mounting hole formed in the lengthwise middle thereof. The lower end of the control link 48 is pivotally connected to the mounting hole of the first link lever 45a. Specifically, the control link 48 is mounted to the lengthwise middle of the first link lever 45a as by a bolt journalled in a bush inserted in the through hole at its lower end. Thus, the control link 48 is pivotally movable relative to the first link lever 45a about an axis extending in the vehicle widthwise direction. In other words, the control link 48 is pivotally connected to the secondary quadric chain 45.

Figure 6:
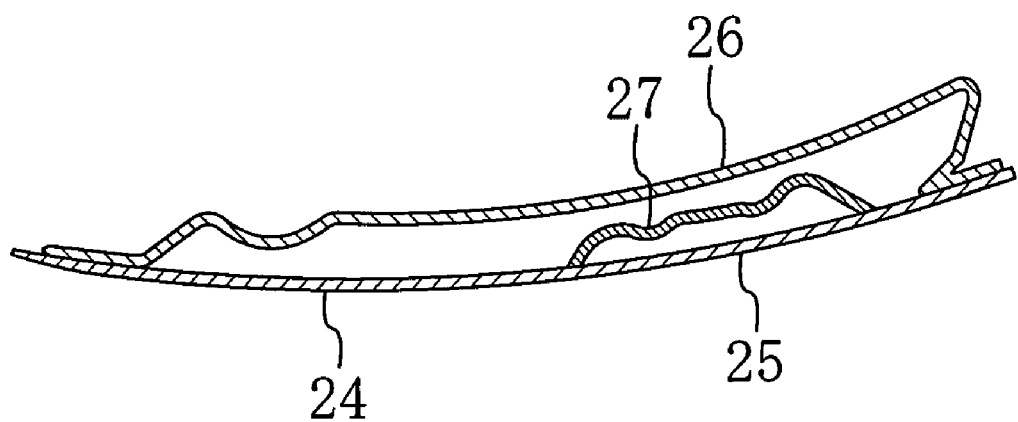
FIG. 6 is a cross-sectional view taken along the line VI-VI of FIG. 5.
Figure 7:
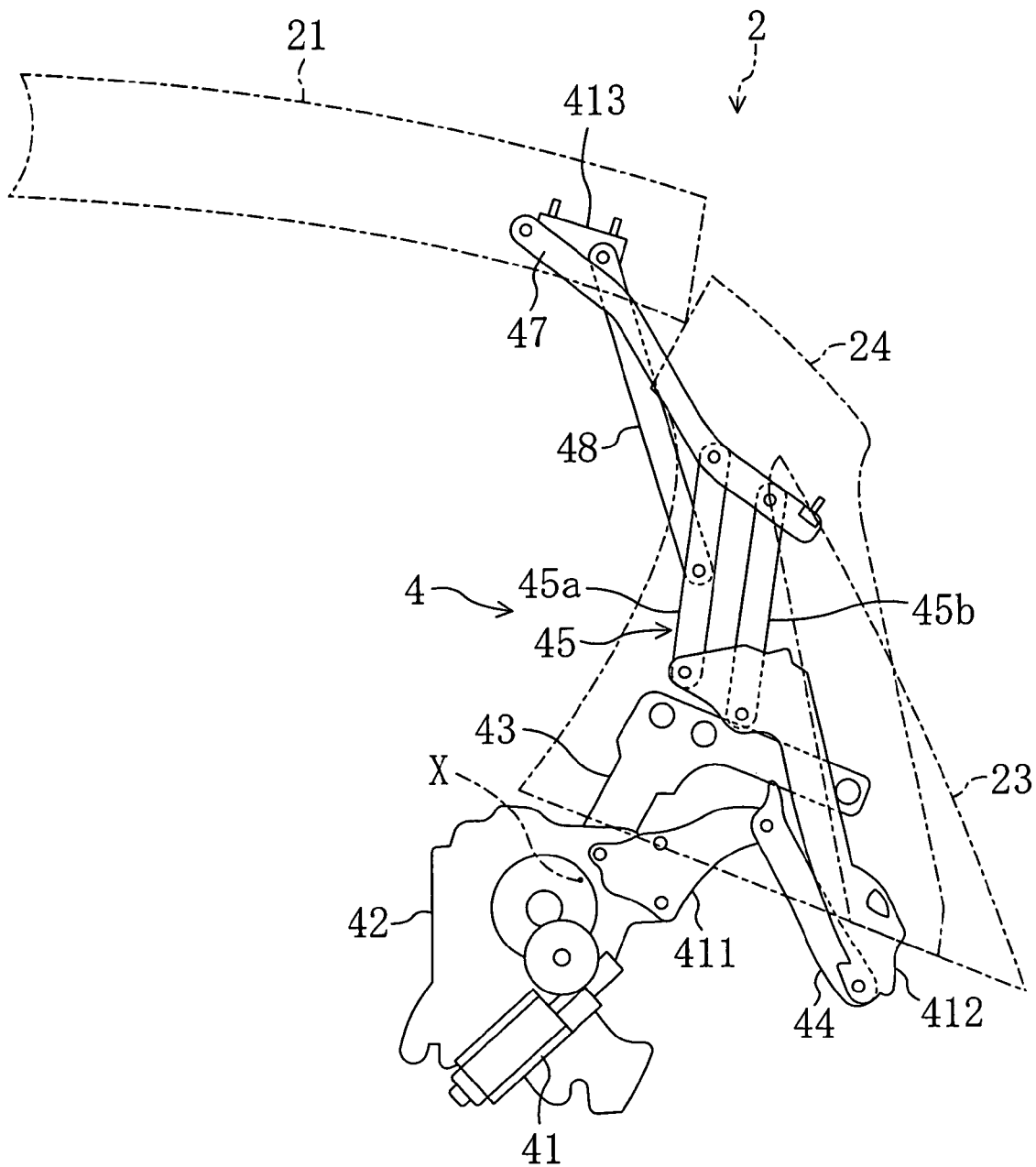
FIG. 7 is a side view showing the linkage mechanism of the retractable roof when approximately one third of a position change process of the retractable roof from its in-use position to its retracted position has passed.

A detailed description is given here of the connection structure of the middle roof panel 24 with the upper and lower arms 47 and 43 with reference to FIGS. 5 and 6.

As described above, the middle roof panel 24 includes the outer panel layer 25, the inner panel layer 26 and the reinforcement 27 placed in between the outer and inner panel layers 25 and 26. The upper and lower arms 47 and 43 are rigidly connected to the reinforcement 27.

The reinforcement 27 is a member substantially in the shape of a plate having a specific waveform cross section. The reinforcement 27 is formed near the upper end with two upper fixing parts 27a and 27a to which the upper arm 47 is fixed, and is formed near the lower end with a lower fixing part 27b to which the lower arm 43 is fixed. The upper and lower fixing parts 27a, 27a and 27b jut into the passenger compartment 13.

The upper arm 47 has two fixed parts 47a and 47a formed at a rear part thereof. The two fixed parts 47a and 47a are located frontward and rearward of the two mounting holes of the upper arm 47 at which the first and second link levers 45a and 45b are pivotally connected. The fixed parts 47a and 47a are fixed to the upper fixing parts 27a and 27a of the reinforcement 27 as by bolts, whereby the upper arm 47 is rigidly connected to the reinforcement 27.

Furthermore, the fixed part 43b of the lower arm 43 is fixed to the lower fixing part 27b of the reinforcement 27 as by a bolt, whereby the lower arm 43 is rigidly connected to the reinforcement 27.

Reference numeral 414 in FIG. 5 denotes a cover attached to the upper arm 47 to cover it from below. The cover 414 prevents the upper arm 47 from being exposed to the passenger compartment 13, thereby improving the appearance of the passenger compartment 13.

As described above, the middle roof panel 24 is pivotally connected through the upper arm 47 to the front roof panel 21 and pivotally connected through the lower arm 43 to the main bracket 42. Thus, the middle roof panel 24 functions as one of the pair of opposite links forming part of the quadric chain for relatively moving the front roof panel 21 to the main bracket 42.

In other words, the one of the pair of opposite links forming part of the quadric chain is constituted by the lower arm 43, the middle roof panel 24 (the reinforcement 27) and the upper arm 47. This is equivalent to that the link is segmented into the lower arm 43, the reinforcement 27 and the upper arm 47. Furthermore, this segmental link functions as a drive link of the quadric chain because the lower arm 43 is driven by the drive motor 41.

On the other hand, the other (a driven link) of the pair of opposite links forming part of the quadric chain is constituted by the window link lever 44, the back window 23 (the window bracket 412), the first and second link levers 45a and 45b and the control link 48.

The retractable roof 2 having the above structure changes from its in-use position to its retracted position by moving as shown in FIGS. 3 and 7 to 9. Note that FIGS. 3, 9, 7 and 8 show the retractable roof 2 in in-use position, that in retracted position, that when approximately one third of the position change process of the retractable roof 2 from its in-use position to its retracted position has passed, and that when approximately two thirds of the position change process have passed, respectively.

When each drive motor 41 starts to be driven, the associated speed reduction gear 43c amplifies the torque so that the lower arm 43 starts to turn about the pivot axis X clockwise in FIG. 3. With the turning of the lower arm 43, the middle roof panel 24 starts to turn clockwise (see FIGS. 3 and 7).

With the turning of the middle roof panel 24, the front roof panel 21 pivotally connected to the middle roof panel 24 (the upper arm 47) moves rearward and diagonally upward. The movement of the front roof panel 21 is restricted on a specified path because the control link 48 is pivotally connected to the front roof panel 21 or, in other words, because a quadric chain is constructed between the front roof panel 21 and the main bracket 42.

In addition, with the turning of the middle roof panel 24, the middle roof panel 24 and the back window 23 relatively move following the operation of the secondary quadric chain 45. Specifically, the back window 23 turns rearward while moving frontward relative to the middle roof panel 24 turning rearward.

Figure 8:
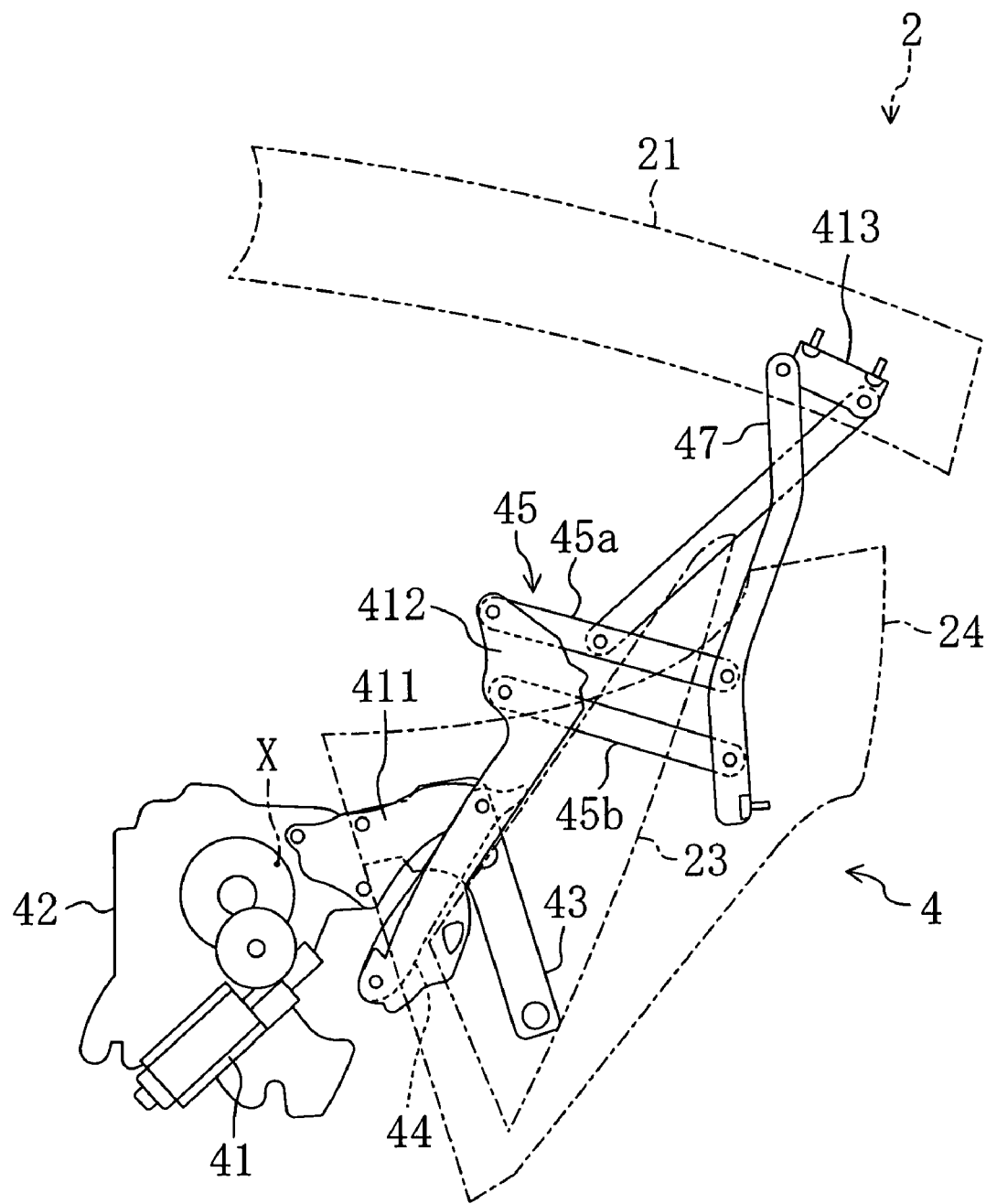
FIG. 8 is a side view showing the linkage mechanism of the retractable roof when approximately two thirds of the position change process of the retractable roof from its in-use position to its retracted position have passed.

When the drive motor 41 continues to rotate, the middle roof panel 24 further turns and is substantially laid down (see FIG. 8). During the time, the front roof panel 21 further moves rearward and is then positioned above the middle roof panel 24.

When the drive motor 41 further continues to rotate, the middle roof panel 24 further turns rearward and is stowed in the storage room 12 (see FIG. 9). With this rearward turning of the middle roof panel 24, the front roof panel 21 moves downward, is then stowed in the storage room 12 and positioned just above the middle roof panel 24 therein. Thus, the front and middle roof panels 21 and 24 lie one over the other. On the other hand, the back window 23 is brought into superposed relation with the middle roof panel 24 as viewed along an axis extending in the vehicle widthwise direction.

In changing the retractable roof 2 from its retracted position to its in-use position, the retractable roof 2 moves in a reverse manner to that as described above.

In the above retractable roof 2, the middle roof panel 24 functions as one of the pair of opposite links that lie between the front roof panel 21 and the main bracket 42 to provide a quadric chain. Thus, the number of links disposed in the passenger compartment 13 is reduced by one as compared to that of the conventional retractable roof, which saves the weight of the retractable roof 2.

Particularly, the upper arm 47 on the middle roof panel 24 is pivotally connected to the front roof bracket 413 at a point closer to the vehicle front than the control link 48. Thus, the middle roof panel 24 constitutes the front side link of the pair of opposite links arranged alongside each other in the vehicle front-to-rear direction and forming part of the quadric chain. Therefore, there is no link largely protruding into the passenger compartment 13 when the retractable roof 2 is in its in-use position. In addition, the rear side link of the pair of opposite links is disposed away from the passengers.

Furthermore, the rear side link is constituted by the window link lever 44, the back window 23 (the window bracket 412), the first and second link levers 45a and 45b and the control link 48. Since, in this manner, the rear side link is constituted by a plurality of relatively short link members connected to each other, there is no need for a single long link member for connecting the front roof panel 21 to the main bracket 42. This also prevents any link from protruding into the passenger compartment 13, thereby widening the space of the passenger compartment 13 in the vehicle front-to-rear direction. In addition, the elimination of the need for a single long link member is advantageous in weight saving of the retractable roof 2.

Since the middle roof panel 24 functions as a link of the quadric chain, this eliminates the need for the pair of opposite link members of the quadric chain to be offset from each other in the vehicle widthwise direction. Thus, the space of the passenger compartment 13 can be widened in the vehicle widthwise direction.

As described above, since the space of the passenger compartment 13 is widened in the vehicle front-to-rear and widthwise directions, this improves the comfortableness in the passenger compartment 13.

Furthermore, since apart from the middle roof panel 24 the back window 23 also constitutes part of the linkage mechanism, the number of members constituting the linkage mechanism can be accordingly reduced. This is advantageous in extension of the space of the passenger compartment 13, reduction in the number of parts and weight saving.

The link constituted by the middle roof panel 24 is a segmental link segmented into the upper arm 47, the lower arm 43 and the reinforcement 27 and the reinforcement 27 is placed in between the outer and inner panel layers 25 and 26 of the middle roof panel 24. Therefore, the middle part of the segmental link is not exposed to the passenger compartment 13, thereby improving the appearance of the passenger compartment 13. In addition, since there is no need to provide any special cover for covering the link, such as a trim piece, the space of the passenger compartment 13 can be accordingly increased.

Furthermore, since the reinforcement 27 is originally a member for reinforcing the middle roof panel 24, this provides reduction in the number of parts and weight saving of the retractable roof 2. Since the middle roof panel 24 is made of resin, the retractable roof 2 can be saved in weight while keeping a required rigidity as a roof and a link.

The back window 23 is movable relative to the middle roof panel 24 and, in a retracted position of the retractable roof 2, is superposed with the middle roof panel 24 as viewed along an axis extending in the vehicle widthwise direction. Therefore, the retractable roof 2 can be vertically downsized in the storage room 12 and, in turn, the storage room 12 can be downsized.

Since the secondary quadric chain 45 for providing relative movement between the back window 23 and the middle roof panel 24 is disposed between the upper and lower arms 47 and 43, its first and second link levers 45a and 45b are not superposed with the arms 43 and 47 in the vehicle widthwise direction. Therefore, the first and second link levers 45a and 45b can be disposed towards the vehicle exterior in the passenger compartment 13, which increases the space of the passenger compartment 13. In addition, coupled with the elimination of the need to offset the pair of opposite link members of the quadric chain from each other in the vehicle widthwise direction, the back window 23 can be widened in the vehicle widthwise direction. This increases the design flexibility.

The synchronization between the position change operation of the retractable roof 2 and the relative movement of the back window 23 to the middle roof panel 24 is realized by pivotally connecting the control link 48 to the first link lever 45a. In other words, the control link 48 contributes to both the position change operation of the retractable roof 2 and the relative movement of the back window 23 to the middle roof panel 24. Therefore, there is no need for an additional link member solely for the purpose of synchronizing the above position change operation and the above relative movement. This is advantageous in extension of the space of the passenger compartment 13, reduction in the number of parts and weight saving.

Although in the above embodiment the control link 48 is pivotally connected to the first link lever 45a, it may be pivotally connected to the second link lever 45b. Also in this case, the retractable roof 2 moves in the same manner. Alternatively, the control link 48 may be pivotally connected to the window bracket 412. Also in this case, the retractable roof 2 moves in the same manner. However, if the control link 48 is pivotally connected to the first link lever 45a located towards the vehicle front, its length can be shortened. This offers an advantage that the protrusion of the link can be reduced.

Although in the above embodiment the control link 48, the first and second link levers 45a and 45b, the back window 23 and the window link lever 44 function as one of a pair of opposite links forming part of a quadric chain, the linkage configuration is not limited to this.

Although in the above embodiment the back window 23 is configured to move relative to the middle roof panel 24, it may be formed integral with the middle roof panel 24.

In addition, the link placed in the middle roof panel 24 is not limited to the link forming part of the quadric chain and may be any other type of link.

The drive source for the linkage mechanism 4 is not limited to the drive motor 41 and may be implemented in other types of rotary actuators or linear actuators such as a hydraulic cylinder.

The present invention is not limited to the above embodiment but can be implemented in various forms without departing from its spirit and essential characteristics. The above embodiment should therefore be considered in all respects as illustrative only but not restrictive. The scope of the invention is indicated by the claims but not at all restricted to the description. Further, all modifications and changes which come within the range of equivalents of the claims are intended to be embraced within the scope of the invention.

What is claimed is:

1. A retractable roof comprising:
    a front roof panel for covering a passenger compartment of a vehicle from above;
    a back roof panel, disposed on the rear side of the front roof panel, for covering the passenger compartment from the rear, the back roof panel being formed by joining an outer panel layer and an inner panel layer to each other;
    a lower link pivotally connected to a vehicle body member;

an upper link pivotally connected to the front roof panel; and an intermediate link rigidly connected to the lower link and the upper link and placed in between the outer and inner panel layers of the back roof panel.

2. The retractable roof of claim 1, wherein the intermediate link is a reinforcement for the back roof panel.

3. The retractable roof of claim 2, wherein
the back roof panel is made of resin, and
the intermediate link is made of metal.

4. The retractable roof of claim 1, wherein
the intermediate link is fixed to the back roof panel, and
the retractable roof further comprises a linkage mechanism for relatively moving the front roof panel to the vehicle body member.

5. The retractable roof of claim 4, wherein
the back roof panel is divided into a back window and a middle roof panel disposed between the back window and the front roof panel, and
the linkage mechanism comprises:
a window link lever pivotally connected to the back window and the vehicle body member;
a pair of link levers both pivotally connected to the back window and the middle roof panel; and
a control link pivotally connected to any one of the back window and the link levers and pivotally connected to the front roof panel.

6. A vehicle with a retractable roof, the retractable roof comprising:
a front roof panel for covering a passenger compartment of the vehicle from above;
a back roof panel, disposed on the rear side of the front roof panel, for covering the passenger compartment from the rear, the back roof panel being formed by joining an outer panel layer and an inner panel layer to each other;
a lower link pivotally connected to a vehicle body member;
an upper link pivotally connected to the front roof panel; and
an intermediate link rigidly connected to the lower link and the upper link and placed in between the outer and inner panel layers of the back roof panel.

* * * * *